United States Patent
Lugiewicz

[15] 3,703,064
[45] Nov. 21, 1972

[54] PACKAGING OF MEAT

[72] Inventor: Robert C. Lugiewicz, Monroeville, Pa.

[73] Assignee: Cubb-Pac Corporation, Pittsburgh, Pa.

[22] Filed: March 30, 1970

[21] Appl. No.: 23,626

[52] U.S. Cl. .......................................... 53/122, 17/41
[51] Int. Cl. ............................................... B65b 63/02
[58] Field of Search ....................... 53/122; 17/35, 41

[56] References Cited

UNITED STATES PATENTS

| | | |
|---|---|---|
| 557,032 | 3/1896 | Seideman ................... 17/41 X |
| 3,078,628 | 2/1963 | Ready ....................... 53/122 X |
| 1,043,241 | 11/1912 | Louden ......................... 17/41 |

*Primary Examiner*—Travis S. McGehee
*Attorney*—Learman & McCulloch

[57] ABSTRACT

A package of meat comprising discrete pieces of meat compacted and shaped into a solid bar tightly encased within a flexible, tubular receptacle closed at both ends. The bar of meat is formed by introducing the meat pieces to a housing within which is a continuously rotating conveyor screw by means of which the meat pieces are conveyed to the discharge end of the housing that has a plurality of openings with each of which is associated an elongate tube. Each tube receives the open end of a flexible receptacle and the discharge of meat from the housing into the respective tubes is controlled by a valve which is operable to open and close the discharge openings sequentially so as to enable filling of the receptacles one after another. As each receptacle is filled, it is pushed off its associated tube, but prior to its being completely filled the valve is operated to close the opening through which the meat is discharged and open another opening, thereby discontinuing the filling of the one receptacle and beginning the filling of another receptacle. The partially filled receptacle is removed from its associated tube and the unfilled portion of the receptacle is closed so as to provide a sealed package. During the filling of the other receptacle, a fresh receptacle may be placed over the tube from which the partially filled receptacle was removed, thereby enabling successive packages of meat to be formed continuously.

6 Claims, 8 Drawing Figures

PATENTED NOV 21 1972　　3,703,064

INVENTOR.
ROBERT C. LUGIEWICZ
BY
Learman & McCulloch

INVENTOR.
ROBERT C. LUGIEWICZ

PACKAGING OF MEAT

The invention disclosed herein relates to the packaging of meat and more particularly to the packaging of discrete pieces of boneless beef or the like in individual bars or sticks for subsequent grinding or other purposes. Boneless meat intended for subsequent grinding into hamburger and the like for many years was frozen into solid blocks weighing 60 to 70 pounds each and which subsequently were sawed into lengths which could be accommodated by conventional meat grinders. More recently, boneless beef has been encased in tubular, flexible casings and frozen so as to form frozen bars of a diameter capable of being introduced directly to conventional meat grinders. Such bars have been formed by a continuous extruding process wherein the discrete pieces of meat are compacted and extruded into an extremely long casing which is withdrawn from a tube or horn by the meat itself as it is extruded. Downstream from the horn the encased bar is cut into substantially uniform lengths which are packed in containers and frozen. The packing of the meat pieces in bar form has many advantages over the packing of meat in solid block form, but experience has shown that additional advantages can be obtained by enclosing each bar of meat in a completely closed receptacle or casing.

In the encasing of bars of meat, the meat is compressed to some extent by the casing with the result that, when the bar and casing are cut, the meat may expand causing the ends of the bar to provide somewhat from the ends of the casing. When such a bar is packed in a container with other like bars and frozen, the projecting ends of the meat of adjacent bars may freeze to one another, thereby making it difficult to separate the bars.

When encased, frozen bars of meat are prepared for grinding and the like, they must be partially thawed. If the casing is open at its ends, some of the moisture may escape during the thawing process, resulting in undesirable effects. In addition, the open end casing makes possible contamination of the exposed portions of the meat bar unless adequate precautions are taken.

All of the foregoing characteristics can be overcome by packing each bar of meat in an individual receptacle which can be closed at both ends. Apparatus and methods in existence heretofore for packing meat and the like in individual, closed containers, however, have required an intermittent or batch packing operation. That is, the meat product is extruded into a casing having a closed end until such time as the casing is full, whereupon the extruding process is interrupted so as to enable the filled casing to be removed, closed at its other end, and replaced by an empty casing. Thereupon, the process is repeated. Such as intermittent type of operation is uneconomical because of the time required to substitute an empty casing for one that has been filled and because of the necessity of purchasing machine control devices which enable the stopping and starting of the packing machinery.

An object of this invention is to provide continuously operable apparatus for packaging discrete pieces of material such as meat in elongated bars wholly enclosed within a tubular, flexible container.

Another object of the invention is to provide a continuous method for packaging meat in individual, closed containers.

A further object of the invention is to provide a package of discrete pieces of meat compacted into solid bar form and wholly enclosed within a container.

Another object of the invention is to provide methods and apparatus for enabling discrete pieces of meat to be formed in either a continuous bar or, alternatively, in individual lengths, as desired.

Other objects and advantages of the invention will be pointed out specifically or will become apparent from the following description when it is considered in conjunction with the appended claims and the accompanying drawings, in which:

Figure 1:
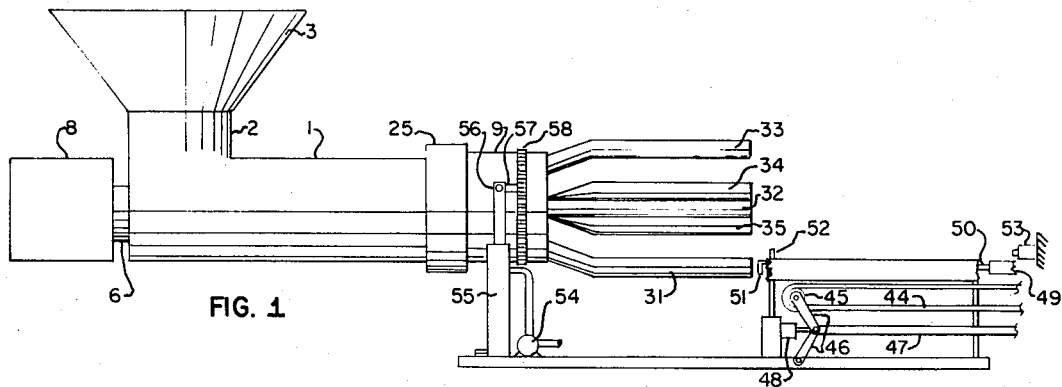
FIG. 1 is a fragmentary, side elevational view of apparatus constructed in accordance with one embodiment of the invention.

Apparatus constructed in accordance with the embodiment of the invention illustrated in FIGS. 1–4 comprises a cylinder 1 terminating at one end in an upstanding throat 2 which communicates with a hopper 3 by means of which discrete pieces of material such as boneless beef may be introduced to the cylinder 1. The opposite end of the cylinder is open and is provided with external threads 4. Within the cylinder is a conveyor or feed screw 5 comprising a shaft 6 on which is fixed a helical vane 7. The shaft 6 is coupled to a preferably variable speed electric motor 8 by means of which the feed screw may be rotated in such direction as to convey the meat pieces in the cylinder toward the threaded, open end 4 of the cylinder 1. The meat pieces entrained by the vane 7 are compacted into a substantially solid, helical coil, but the meat pieces are not ground or comminuted by the feed screw. Instead, the meat pieces remain discrete pieces of meat and merely are conveyed, in compacted form, toward the open end of the cylinder.

Mounted at the open end of the cylinder 1 is a receiver 9 and a valve 10, the valve extending in prolongation of the cylinder 1 and having an annular wall 11 forming a chamber 12 to which meat discharged from the cylinder is received. The members 9 and 10 are rotatable relatively to each other, but the valve 10 is fixed relatively to the cylinder 1 by any conventional means. Within the chamber 12 is a deflecting member 13 having a conical surface 14 which forms a substantially funnel-shaped inlet leading to a port 15 having tapered sides and formed in the end wall 16 of the valve 10. The receiver 9 has an end wall 17 and an annular side wall 18 that terminates adjacent its open end in an annular shoulder 19 provided with a radially inwardly projecting lip 20. The shoulder 19 accommodates a flange 21 formed on the valve wall 11, and between the flanges 20 and 21 is a retaining ring 22 containing balls 23 and a plurality of springs 24 which react between the flanges 20 and 21 so as to maintain the end walls 16 and 17 in face-to-face engagement. The assembly of the housing 9 and the valve 10 are removably retained on the threaded end of the cylinder 1 by a threaded clamping ring 25.

Figure 3:
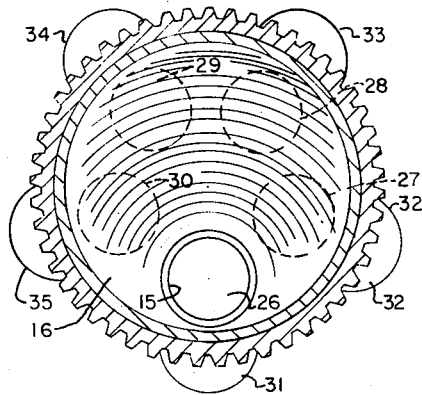
FIG. 3 is an enlarged sectional view taken on the line 3—3 of FIG. 2.

As is best indicated in FIG. 3, the end wall 17 of the housing 19 is provided with five openings 26, 27, 28, 29 and 30, although any number of openings greater than one may be provided. Each of the openings in the housing 9 is the same size as and is registrable with the valve port 15. Fixed to the end wall 17, and in communication with the opening 26, is one end of a discharge tube 31 which extends for a short distance obliquely outwardly and forwardly of the longitudinal axis of the cylinder 1 and then extends parallel to the cylinder's longitudinal axis. A similar discharge tube 31–35 communicates with the openings 27–30, respectively.

Over each tube 31–35 may be fitted an elongated, flexible casing or receptacle 36 formed of polyethylene or the like, each receptacle having a closed end 36a. When assembling a receptacle 36 on a tube, the closed end of the receptacle is located adjacent the open end of the discharge tube so as to be engaged by material discharged from the tube.

Figure 4:
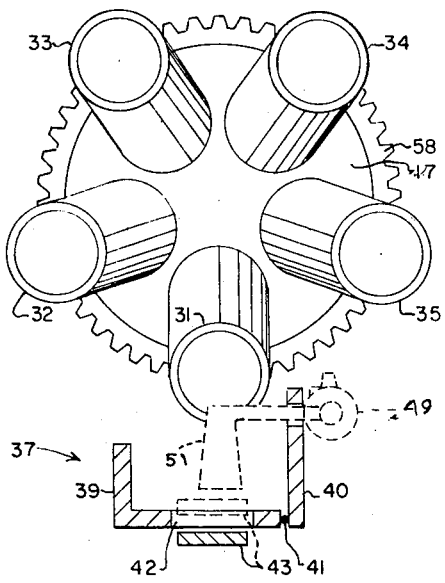
FIG. 4 is an enlarged sectional view taken on the line 4—4 of FIG. 2.

Adjacent the open end of the discharge tube 31 is a trough-like support member 37 having a bottom 38 and two side walls 39 and 40. The wall 40 is hinged to the bottom 38 by a spring biased, piano type hinge 41 in such manner that the wall 40 normally occupies an upstanding position as shown in FIG. 4, but may be swung clockwise for a purpose presently to be explained. The bottom 38 of the member 37 is provided with a longitudinal slot 42 which overlies the upper run 43 of an endless conveyor belt 44 that is trained around pulleys, one of which is shown at 45 in FIGS. 1 and 2. The upper run 43 of the conveyor belt is driven by an electric motor (not shown) from left to right, as viewed in FIGS. 1 and 2.

The pulleys 45 are mounted on toggle links 46 which are joined by a motion transmission bar 47. Also connected to the toggle links 46 is the reciprocable plunger of a solenoid 48 which, in its non-energized condition, maintains the toggle links 46 in a collapsed state so as to locate the upper run 43 of the conveyor belt below the level of the bottom 38 of the support member 37. When the solenoid is energized, however, the toggle links are erected thereby shifting the upper run 43 of the conveyor belt through the slot 42 so as to occupy a position above the level of the bottom 38. The purpose of this construction will be explained hereinafter.

The wall 40 of the support member 37 carries a cylinder 49 within which is mounted a piston (not shown) to which is joined one end of a piston rod 50, the outer end of the piston rod having a finger 51 which overlies the bottom 38 of the member 37. The piston rod 50 normally is urged to its projected position, as shown in FIG. 1, by a spring (not shown) which reacts between the cylinder and the piston has a conventional check valve provided with a bleed opening which permits rapid movement of the piston rod 50 to its projected position, but which yieldably resists movement of the piston rod to its retracted position.

The piston rod 50 also carries adjacent its outer end an operating arm 52 which is adapted to engage and close an electric switch 53 when the piston rod is moved to its retracted position. Closing of the switch 53 energizes the solenoid 48 so as to erect the toggle links 46 in the manner previously described.

The switch 53 also is connected to a solenoid controlled actuating valve 54 which, when opened, enables fluid such as compressed air to be delivered from a source thereof to a cylinder 55 within which is mounted a reciprocable piston (not shown) to which is connected a rod 56 that normally is spring urged to its projected position. At its free end the rod 56 carries a pivoted operating member or ratchet pawl 57 which is engageable with a ring of ratchet teeth 58 mounted on the housing 9. Opening of the valve 54 in response to closing of the switch 53 causes the piston rod 56 to be retracted, thereby enabling the pawl 57 to engage a tooth 58 and rotate the housing member 9 a distance sufficient to move the opening 26 out of register with the port 15 and move the opening 27 into register with the port 15.

Figure 2:
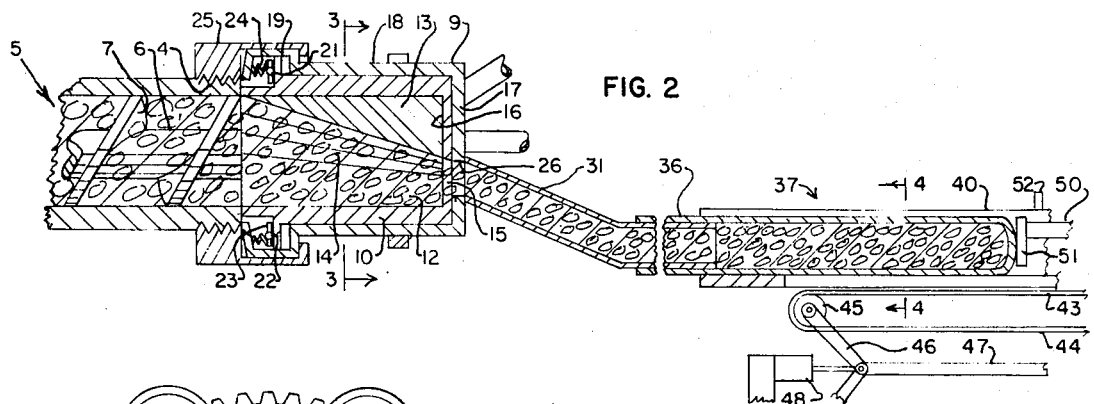
FIG. 2 is an enlarged, longitudinal sectional view of the apparatus shown in FIG. 1.

As is illustrated in FIGS. 1 and 2, the wall 40 of the support member 37 lies in the path of rotation of the discharge tube 31. As the member 9 is rotated, the tube 31 will swing the wall 40 clockwise, as viewed in FIG. 4, to disengage the arm 52 and the switch 53 so as to permit the latter to open, thereby deenergizing the solenoid 48 and closing the valve 54. The switch is not opened, however, until such time as the opening 27 is in register with the port 15 and until such time as the tube 31 has cleared the wall 40, thereby enabling the latter to return to its upright position. Following the opening of the switch 53, the piston rods 50 and 56 are returned by their respective springs to their extended positions.

In the operation of the apparatus thus far described, each of the discharge tubes 31–35 will be fitted with a receptacle 36 and the motor 8 will be started so as to rotate the feed screw 5 continuously in a direction to feed material in the cylinder 1 from left to right, as shown in FIGS. 1 and 2. As meat pieces are introduced to the cylinder 1 via the hopper 3 and the throat 2, they will be discharged into the chamber 12 and will pass from the latter into the tube 31 via the port 15 and the opening 26. As the meat pieces move through the tube 31 in the form of a bar, the leading end of the meat bar will engage the closed end 36a of the receptacle 36 and will move the latter to the right, or in a direction such as to remove the receptacle from the tube 31. The closed end 36a will engage the finger 51 which yieldably will resist such movement of the receptacle, thereby causing the pieces of meat in the receptacle to be compacted tightly and shaped thereby into substantially solid bar form.

Filling and simultaneous movement of the receptacle continues until such time as the arm 52 engages the switch 53. The switch 53 is so located that, upon its engagement by the arm 52, a short length of the receptacle still will be on the tube 31. The receptacle, therefore, will be less than completely filled.

Upon closing of the switch 53, the conveyor belt 44 will be elevated, thereby enabling its upper run 43 to engage the receptacle 36 and convey the latter to the right so as to remove the receptacle from the tube 31.

At the same time, the actuator valve 54 will be opened so as to effect rotation of the valve member 9 in a direction to register the opening 27 with the port 15, whereupon meat will be discharged to the tube 32 so as to initiate filling of the casing thereon. By this time the machine operator will have removed the previously partially filled receptacle and the restraining finger 51 will have returned to its projected position to engage the closed end of the receptacle then being filled.

The partially filled receptacle will have a short length of receptacle material at the open end thereof which can be closed in any conventional manner. For example, the free end of the receptacle can be doubled back over a portion of the filled receptacle and heat fused or otherwise sealed to form an elongate, tightly packed bar 55 of discrete meat pieces fully enclosed within the receptacle.

The operator of the machine then may fit a new receptacle over the end of the tube 31 so as to condition it to receive meat when it again is indexed to such positions as to register the opening 26 with the port 15.

An important characteristic of the invention is that the size and arrangement of the opening 26-30 are such and the location and size of the port 15 are such that, as the members 9 and 10 rotate relatively to each other, the closing of one opening is accompanied by the opening of another opening, thereby providing a substantially constant size discharge opening from the member 10 and preventing mushing of the meat pieces in the latter. Inasmuch as the openings 26-30 do not overlap one another, there will be a slight reduction in size of the total discharge opening from the member 10 until such time as one of the openings is in register with the port 15, but this is compensated for by movement of the restraining finger 51 out of the path of the partially filled receptacle, thereby relieving momentarily the generation of pressure on meat in the housing 12. Moreover, the movement of the member 9 from one position to another is extremely rapid thereby greatly minimizing the effects of any momentary reduction in size of a discharge opening.

Since indexing movement of the member 9 will occur when the port 14 and the opening 26 contain meat, it is important that the meat be cut at the interface between the walls 15 and 17. This is accomplished by the taper of the port 15. The face-to-face engagement of the walls 16 and 17, coupled with the constant bias of the springs 24, enable the cutting edge of the port 15 to remain sharp.

Figure 5:
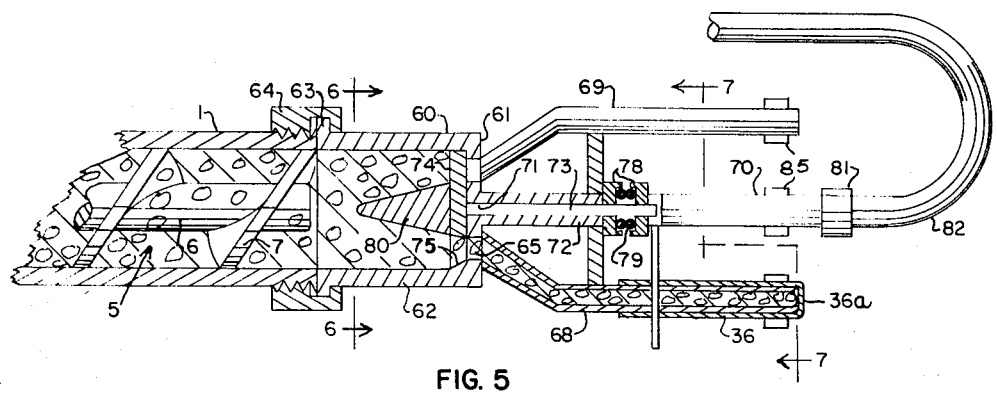
FIG. 5 is a view similar to FIG. 2, but illustrating a modified form of apparatus.
Figures 6, 7:
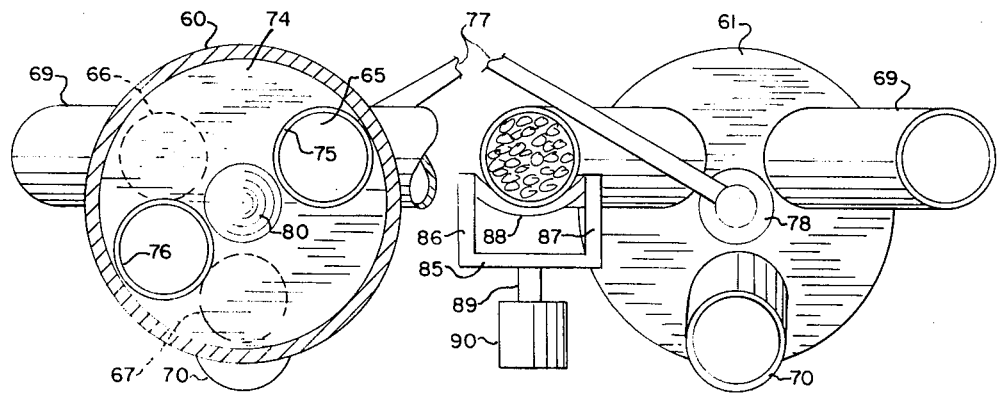
FIG. 6 is a sectional view taken on the line 6—6 of FIG. 5.
FIG. 7 is a sectional view taken on the line 7—7 of FIG. 5.
Figure 8:
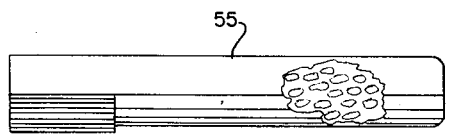
FIG. 8 is an elevational view, partly broken away, of a typical meat product constructed in accordance with the invention.

The embodiment of the invention illustrated in FIGS. 5-7 comprises a receiver member 60 having an end wall 61 and an annular wall 62 terminating in a flange 63 which abuts the open end of the cylinder 1 and is maintained in assembled relation therewith by a clamp ring 64. The end wall 61 has three openings 65, 66, and 67 of uniform size, and spaced 120° from one another. A discharge tube 68 has one end secured to the end wall 61 in communication with the opening 67. Similar tubes 69 and 70 are fixed to the wall 61 in communication with the openings 66 and 67, respectively.

The end wall 61 has a central opening 71 which communicates with a sleeve 72 within which is rotatably accommodated an operating shaft 73. At one end the shaft 73 is fixed to a valve disc 74 which is in face-to-face engagement with the inner surface of the end wall 61 and which has two, diametrically opposed, tapered ports 75 and 76 therein each of which is of the same size as each of the openings 65–67. To the other end of the shaft 73 is fixed an actuating handle 77 and between the handle and the end of the sleeve 72 is a pair of axially slidable cup members 78 between which is accommodated a compression spring 79. The spring 79 constantly exerts a force on the valve 74 urging it toward the end wall 61.

Secured to the valve 74 is a centrally located cone 80 which deflects meat entering the receiver 60 from the cylinder 1 toward the periphery of the receiver 60 where the openings 65–67 are located.

To condition the apparatus for operation, a receptacle 36 may be fitted over each of the discharge tubes 68–70, but for purposes of illustration the tube 70 is not provided with a receptacle. Instead, the tube 70 is connected by a coupling 81 to an elongated tube 82 which communicates with the hopper 3.

In the operation of the apparatus, the feed screw 5 rotates continuously so as to deliver meat pieces to the receiver 6. In the position of the valve 74 illustrated in FIGS. 5 and 6, meat will pass from the receiver 60 through the port 75 and the opening 65 into the tube 68 for discharge to the receptacle 36 which, as before, will be moved off the tube 68 as the receptacle is filled. If desired, a troughlike support similar to the support 37 may be provided adjacent each tube 68 and 69, but the wall 40 need not be pivoted inasmuch as the discharge tubes do not rotate. Alternatively, a channel member 85 may be located adjacent the free end of each discharge tube 68 – 70, each channel member having a pair of spaced apart, upstanding arms 86 and 87 spanned at their upper ends by an elastic member 88 that is engageable with the associated receptacle 36 so as yieldably to restrain movement thereof off the discharge tube during filling of the receptacle. The channel is carried by the armature 89 of a solenoid 90 which may be operated either mannually or automatically in timed relation to the discharge of material through the tubes to move the members 88 toward and away from their associated tubes.

When the receptacle on the tubes 68 is substantially full, but before being completely full, the handle 77 may be rotated through 120° so as to register the port 65 with the opening 66, whereupon meat will be discharged from the receiver 60 into the tube 69 so as to fill the receptacle 36 on that tube. As this receptacle is being filled, the partially filled receptacle 36 may be removed from the tube 68 and have its open end closed, as described earlier to form the product 55, and a fresh receptacle may be fitted to the tube 68 in readiness to receive additional meat when the valve 74 is returned to its original position.

Because the openings 65 and 66 are so greatly spaced apart, rotation of the valve 74, no matter how quickly, would interrupt discharge of meat from the receiver 60 for an amount of time sufficient to result in mushing of the meat in the receiver and, perhaps, in the cylinder 1. It is to prevent this that the opening 67 and the port 76 are provided. Thus, as the valve 74 is rotated, the port 76 will uncover the opening 67 as the opening 65 is being covered. This will allow meat to pass from the receiver 60 into the tube 70, thereby avoiding the building up of excess pressure in the receiver 60. As the port 65 begins to uncover the opening 66, the opening 67 will begin to be covered, thereby enabling discharge of meat to the tube 69. When the valve 74 is returned to its initial position, the port 76 and the opening 67 perform the same function.

The actuating handle 77 may be manipulated by hand, as disclosed, or if desired, it may be coupled to any conventional mechanism for oscillating the handle back and forth in timed relation to the discharge of meat from the receiver.

If the tube 82 is coupled to the tube 70, the meat introduced to the latter will be returned to the hopper 3 so as to be recycled through the apparatus without waste. If desired, meat from the tube 70 may be discharged directly to a container, the contents of which may be emptied periodically into the hopper 3.

If desired, the tube 70 may be made considerably longer than the tubes 68 or 69 or, alternatively, the tube 70 may be coupled to a straight length of tube over which an extremely long casing may be fitted. In this event meat may be extruded continuously through the port 76 and the opening 67 into the tube 70 so as to produce an elongated bar of meat which may be cut into lengths in the manner described in U.S. Pat. No. 3,316,104. It will understood, of course, that any of the discharge tubes of either of the disclosed embodiments may be used at any time for the continuous discharge of meat therethrough in the manner disclosed in the aforementioned patent. To accomplish this, the selected discharge tube should be registered with the appropriate valve port and the valve be permitted to remain in register with that tube.

The quantity of meat discharged through any tube in any given time will depend largely on the time interval between the indexing of the receiver and valve members. This time interval may be controlled in the case of the first-described embodiment by adjustment of the position of the switch 53 and in the case of the second-described embodiment by the length of time between manipulation of the actuating handle 77 from one position to another. As a consequence, the apparatus is capable of producing meat packages of different quantities and weights.

Although the disclosure has been concerned primarily with the packaging of discrete pieces of boneless beef, it is important to note that the characteristics of the material discharged from the apparatus correspond essentially to the characteristics of the material introduced to the cylinder 1. Thus, if the material introduced to the cylinder is either relatively large or relatively small pieces of meat, the packaged product also will be either large or small pieces of meat. The only difference in the input and output materials will be that attributable to the cutting or shearing action of the cutting edge of the valve ports during relative rotations of the valve and receiver members.

The disclosed methods and apparatus are intended to be representative of presently preferred forms thereof for producing a wholly enclosed, tightly encased bar of discrete pieces of material, but are intended to be illustrative rather than definitive of the invention. The invention is defined in the claims.

I claim:

1. Apparatus for packaging discrete pieces of material such as meat comprising a receiver member having a plurality of openings therein; continuously operable means for feeding said material to and through said receiver member; a valve member in face-to-face engagement with said receiver member and having at leat one port therein registrable with any one of a number of said openings; spring means acting on said members and urging them into said face-to-face engagement, one of said members providing a cutting edge at the interface of said members; means mounting said members for relative movements; and operating means for moving said members relatively to one another to register said port with a selected one of said openings, the arrangement and size of said openings and the location and size of said port being such that as said members are moved relatively to one another said port moves out of registration with said one of said openings and substantially simultaneously into registration with another of said openings.

2. The apparatus set forth in claim 1 including a plurality of tubular discharge members carried by said receiver member and corresponding in number to the number of said openings, each of said discharge members communicating with said receiver via said openings.

3. The apparatus set forth in claim 2 including a tubular receptacle having a closed end and an open end, said open end being fitted over the discharge member in communication with said selected one of said openings, whereby the discharge of material through said selected one of said openings effects delivery of material to said receptacle and simultaneous movement of said receptacle in the direction of discharge of said material from said receiver member.

4. The apparatus set forth in claim 3 including actuating means for operating said operating means to move said members relatively to one another and move said port out of registration with said one of said openings prior to removal of said receptacle from said discharge member whereby the open end of said receptacle may be closed.

5. The apparatus set forth in claim 3 including means in the path of movement of said receptacle for yieldably resisting movement thereof.

6. The apparatus set forth in claim 5 wherein the resistance to movement of said receptacle by said resisting means enables the material delivered to said receptacle to be molded and shaped thereby.

* * * * *